July 4, 1939.   E. C. HORTON   2,165,180
SELF-PARKING WINDSHIELD WIPER
Filed Aug. 30, 1935   2 Sheets-Sheet 1
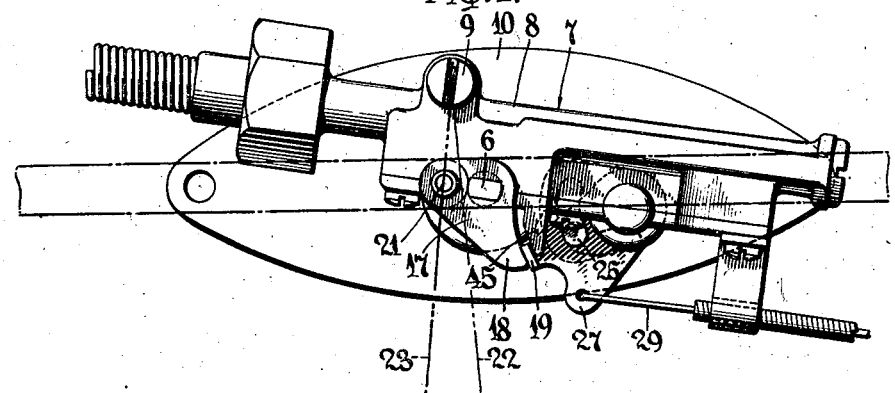
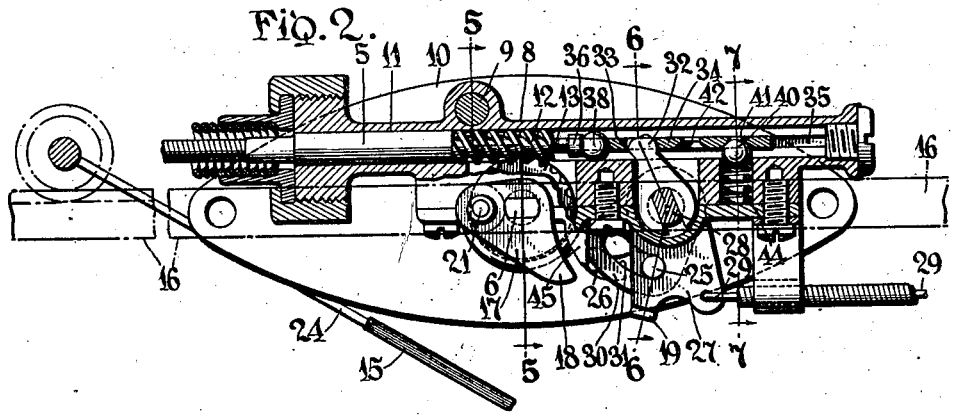
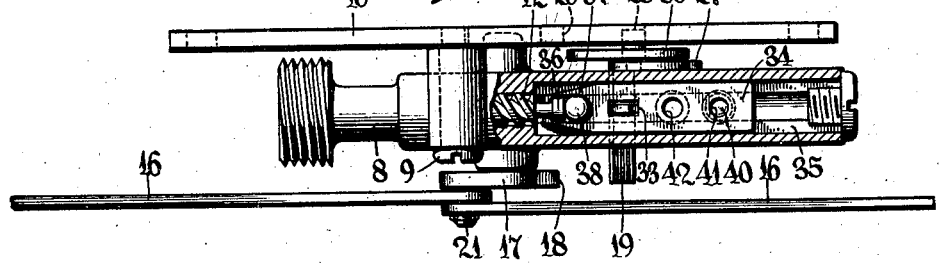
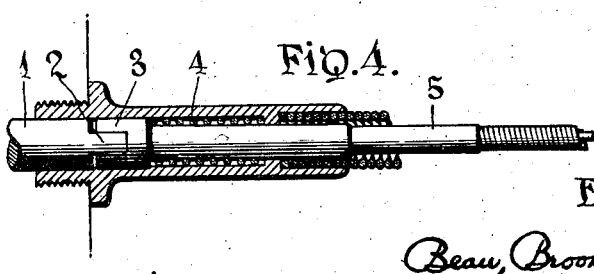
INVENTOR
Erwin C. Horton,
BY
Beau, Brooks, Buckley & Beau,
ATTORNEYS July 4, 1939.  E. C. HORTON  2,165,180
SELF-PARKING WINDSHIELD WIPER
Filed Aug. 30, 1935  2 Sheets-Sheet 2
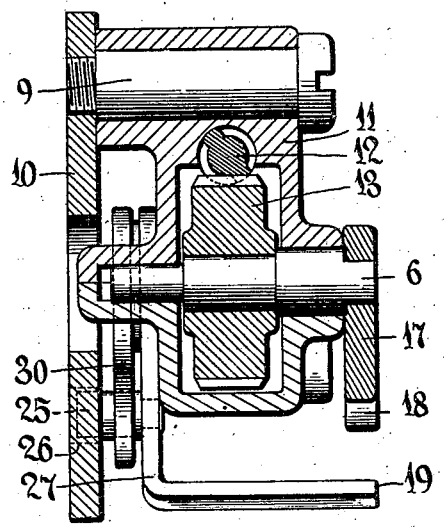
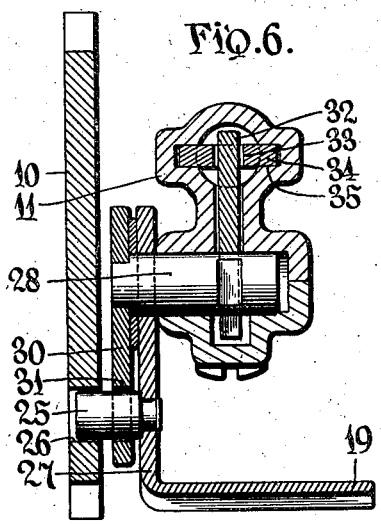
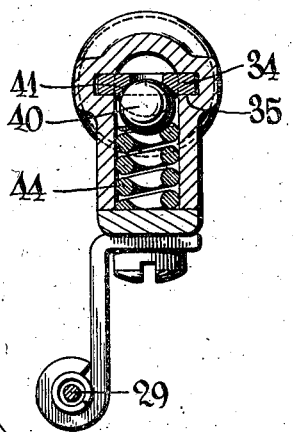
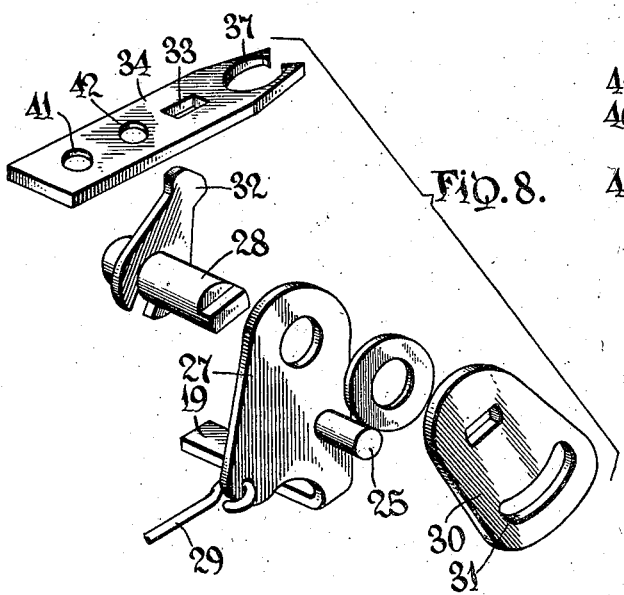
INVENTOR
Erwin C. Horton,
BY
Beau, Brooks, Buckley & Beau.
ATTORNEYS Patented July 4, 1939

2,165,180

UNITED STATES PATENT OFFICE 2,165,180

SELF-PARKING WINDSHIELD WIPER

Erwin C. Horton, Hamburg, N. Y., assignor to Trico Products Corporation, Buffalo, N. Y.

Application August 30, 1935, Serial No. 38,610

10 Claims. (Cl. 15—255)

This invention relates to a means for cleaning the windows of motor vehicles and particularly to that type wherein the wiper element is driven from the vehicle power plant.

The invention has primary reference to means for parking the wiper element to one side of its normal path of movement, so as to maintain the driver's field of vision clear from obstruction by the wiper when the latter is at rest. Means heretofore have been devised for bringing a mechanically driven windshield wiper to a position of rest at one side of the field of vision. Such means have usually comprised spring actuated shut-off devices set to be tripped at a particular point in the cycle of wiper operation.

The present invention has for its object to provide a self-parking mechanical cleaner in which the cleaner is brought to rest by and through the efforts of the transmission between the wiper and its drive. The invention further has for its object to provide a self-parking windshield cleaner in which the parking is accomplished in a practical and efficient manner and by a simplified construction particularly adapted for installation in the present day motor vehicle.

In the drawings which illustrate one embodiment of the invention,

Fig. 1 is an elevation of the windshield cleaner head disposed in its wiper parking position;

Fig. 2 is a longitudinal section through the head illustrating the parts in the wiper operating position;

Fig. 3 is a view illustrating the windshield cleaner head, partly in top plan and partly in horizontal cross-section;

Fig. 4 is a detailed sectional view of the clutch enabling the wiper to be disconnected from its drive;

Figs. 5, 6 and 7 are vertical transverse sectional views about on lines 5—5, 6—6 and 7—7, respectively, of Fig. 2, and Fig. 8 is an exploded view, in perspective, of a portion of the parking construction.

Referring more particularly to the drawings, the source of power for the windshield cleaner comprises the drive shaft 1 and may be driven from the motor vehicle engine, not shown. This drive is provided with a driving clutch part 2 adapted to be coupled to the driven clutch part 3 under the urge of a spring 4, and the driven clutch part in turn connected to the flexible transmission shaft 5 by which power from the drive is transmitted to the wiper actuating shaft 6.

The windshield cleaner head 7, in which the shaft 6 is carried, has a casing 8 pivotally mounted by a pin 9 to a bracket 10 and provided with a journal bearing 11 for the upper end of the transmission shaft 5. Within the casing 8 the shaft 5 carries a worm 12 which has meshing engagement with the worm gear 13 on the wiper actuating shaft 6. This meshing relation is therefore maintained in whatever position the casing may assume about the pivotal axis 9.

The wiper 15 may be carried directly by the actuating shaft 6, or, as illustrated herein, it may be connected thereto through linkage 16. The construction illustrated adapts the cleaner for a plurality of wipers, the linkage 16 extending in opposite directions from the crank arm 17 on the actuating shaft. When the clutch parts are operatively engaged the drive will rotate the worm 12 and, through the gear 13, impart rotary movement to the shaft 6 for operating the wiper means over the window surface.

For parking the wiper, means are provided for unclutching the transmission from the drive during operation of the cleaner and by its power transmitting mechanism. To this end, there is fixed on the actuating shaft 6 an arresting arm 18 so as to rotate therewith. This arresting arm may form a part of the crank arm 17 as illustrated more clearly in Figs. 1 and 2. Within the path of this arresting part is adapted to be positioned a stop member 19, and when so positioned and engaged by said arresting part, the wiper actuating shaft will be arrested in its action. The worm 12, however, will continue to rotate and, because of the arrested arm, will ride longitudinally on the worm gear to pull the transmission shaft 5 axially and disengage the driven clutch part 3 from the driving part 2. This action is timed automatically to arrest the windshield cleaner at one end of the wiper stroke and thereby avoid the wiper from obstructing vision through the window.

In order to dispose the parked wiper outside of its normal path the head 7 is rocked on its pivotal mounting 9 to shift the crank pin 21 of the crank arm 17 laterally from its normal path or from radius line 22 (with respect to the axis 9) to radius 23 in Fig. 1. This movement being multiplied by the wiper carrying arm 24 will dispose the wiper well out of the normal path of operation so that the driver will have the least possible obstruction therefrom. The head 7 therefore serves as an adjustable support for the shaft and is preferably rocked concurrently with the positioning movement of the stop member 19. According to the present disclosure, this is accomplished by having a lug 25 move in a cam slot 26 in the mounting bracket 10, the lug, together with the stop member, being carried on a lever 27 which is pivoted on a shaft 28 and is adapted to be oscillated thereon by an accessible control member 29.

To restore the windshield cleaner to operative relationship with its drive the stop member 19 is withdrawn from the arresting part 18, and the cleaner head is rocked back to the normal position shown in Fig. 2 by the lug 25 working in the cam slot 26. During this movement of the lug the transmission shaft 5 is shifted axially, to the left as viewed in Fig. 2, to bring the clutch part 3 into driving relationship with the clutch part 2 under the urge of the spring 4. This axial shifting movement of the transmission may be accomplished concurrently with the withdrawal of the stop member, as by having the lug 25 engage a rocker arm 30 on the shaft 28, sufficient play between the two being provided by the slot 31 to permit a preliminary rocking of the head when the cleaner is next brought to rest.

A second rocker arm 32 on the shaft 28 engages in a bearing 33 formed in a shift member 34. This member 34 is connected to the transmission shaft 5 for axial movement therewith in the casing 8 but may be constrained against rotational movement therewith by the guide ways 35 in which it is slidably mounted. This shift member is connected to a headed stud 36 on the worm 12 by the yoke arms 37 so as to permit the transmission shaft to rotate relative to the shift member, a thrust bearing in the form of a ball 38 being interposed between the head 36 and the member 34 for greater efficiency. A spring backed ball 40 serves as a detent to engage in a seat 41 in the shift member 34 and thereby yieldably hold the clutch parts together. This ball detent is adapted to engage in a second seat 42 of the shift member for yieldably holding the transmission in an inoperative position. The seats 41 and 42 have sloping entrance ways down which the ball detent may be moved by its spring 44 to urge the transmission shaft axially in one direction or the other and thereby insure a greater separation or more intimate engagement of the clutch parts.

With the parts disposed as illustrated in Figs. 2 and 4, the wiper or wipers will be reciprocated back and forth across the window surface by reason of the worm 12 rotating the wiper actuating shaft 6. When it is desired to discontinue the use of the wiper, the control member 29 is manipulated to pre-set the stop member 19 within the path of the arresting part 18 and so arrest the actuating shaft 6. During the placement of the stop member 19 the cam lug 25 cooperates with the cam slot 26 to rock the windshield cleaner head 7 about the pivotal mounting 9 to shift the wiper stroke from the normal. (The stop member 19 may be given additional support by an abutment 45 on the housing 8). Upon the arrest of the actuating shaft the worm 12 will then begin to ride forwardly, and as it does, press the detent 40 out of the seat 41 and withdraw the clutch part 3 from the clutch part 2, the clutch disengagement occurring just as the detent enters the inclined approach to the seat 42 where additional movement may be imparted by the action of the detent spring 44, if such is desired. During the shifting movement of the transmission shaft, the rocker arm 32 is moved clockwise, as is also the rocker arm 30.

When it is again desired to use the windshield cleaner the control member 29 is pulled to withdraw the stop member 19 and rock the cleaner head counter-clockwise about the axis 9. Concurrently with this operation the cam lug 25 further acts against the rocker arm 30 to oscillate the rocker arm 32 counter-clockwise for imparting reverse shifting movement to the shaft and bring the clutch parts into operative engagement with one another, the ball detent being again engaged in the seat 41 so as to maintain the clutched relationship between the wiper and its drive.

The unclutching of the wiper from its drive is accomplished by the transmission which connects the two elements, thus insuring a more positive parking action with the least number of parts. Furthermore, this power parking takes place beyond the normal limits of wiper operation.

The term "worm" has been used herein in an inclusive sense, since a modified type of worm might be employed or a spiral or other type of gear whereby when the worm gear is arrested the driving gear will be free for limited riding movement thereon.

While a detailed description has been given for ease of understanding, the disclosure is merely illustrative of the inventive principles involved, which may be applied to other physical embodiments without departing from the scope and spirit of the invention claimed.

I claim:

1. Mechanism of the character described, comprising, an actuating shaft, a drive for the shaft, an adjustable support for the shaft, transmission means operatively connecting the drive to the shaft and including a clutch for disconnecting the drive from the shaft, the transmission means having intermeshing power transmitting elements, means for arresting the driven one of said elements, means mounting the driving one of said elements for bodily riding on the driven element when so arrested, the driving element being operatively connected to the clutch for rendering the clutch inoperative to disconnect the drive from the shaft, and manual means for presetting the second means for operation and concurrently shifting said support.

2. Mechanism of the character described, comprising, an actuating shaft, a drive for the shaft, transmission means operatively connecting the drive to the shaft and including a clutch for disconnecting the drive from the shaft, said transmission means also including a driving worm and a worm gear meshing therewith, said worm being connected to the clutch and mounted for axial riding movement on the worm gear tangentially thereof to disengage the clutch when the worm gear is arrested, manually settable means for arresting the worm gear, and means operable by said manual means for laterally shifting the shaft.

3. Mechanism of the character described, comprising, an actuating shaft, a drive for the shaft, transmission means operatively connecting the drive to the shaft and including a clutch for disconnecting the drive from the shaft, said transmission means also including a power transmitting worm and a driven gear meshing with the driving worm and driven thereby, said worm being mounted for axial riding movement on the gear tangentially thereof when the latter is arrested and also being operatively connected to the clutch for disengaging the drive from the transmission means by and during such riding movement, means movable to a position to arrest the gear so that continued movement of the worm will unclutch the drive, and means operable by and during movement of the arresting means to shift the shaft laterally.

4. Mechanism of the character described, comprising, an actuating shaft, a drive for the shaft, transmission means operatively connecting the drive to the shaft and including a clutch for disconnecting the drive from the shaft, a rockable head supporting the shaft, said transmission means also including a worm and a worm gear, said worm being mounted for axial movement on the gear when the latter is arrested and operatively connected to the clutch for disconnecting the drive from the shaft by such axial movement, and means for rocking the head to displace the shaft from its normal operating position and having a part concurrently settable for arresting said worm gear.

5. Mechanism of the character described, comprising, an actuating shaft, a drive for the shaft, transmission means operatively connecting the drive to the shaft and including a clutch for disconnecting the drive from the shaft, a movably mounted head supporting the shaft, said transmission means including a worm and a worm gear, said worm being mounted for axial movement in the head when the worm gear is arrested and operatively connected to the clutch for disconnecting the drive from the shaft by such axial movement, means for arresting said worm gear, and means for restoring the worm to its normal position when said arresting means is rendered inoperative.

6. Mechanism of the character described, comprising, an actuating shaft, a head supporting the shaft and mounted for shifting movement by which the shaft is shifted laterally from its normal operating position, means for manually shifting the head, a drive for the shaft, transmission means including a clutch for transmitting power from the drive to the shaft, and means pre-set by said shifting means and operable by said transmission means for unclutching the drive from the shaft.

7. Mechanism of the character described, comprising, an actuating shaft, a drive for the shaft, transmission means operatively connecting the drive to the shaft and including a clutch for disconnecting the drive from the shaft, a support for the shaft mounted for movement to shift the axis of the shaft laterally, said transmission means being connected to said support, an arresting part operatively connected to the shaft for movement thereby in a definite path, a stop member mounted for movement into the path of said arresting part to be engaged thereby for arresting the shaft, said transmission means including means for disengaging the clutch when said shaft is arrested, and means operable by and during such movement of the stop member to effect movement of the shaft support.

8. Mechanism of the character described, comprising, an actuating shaft, a drive for the shaft, transmission means operatively connecting the drive to the shaft and including a clutch for disconnecting the drive from the shaft, a support for the shaft mounted for movement to shift the axis of the shaft laterally, said transmission means also including a gear rotating with the actuating shaft, pre-set means positionable for arresting the gear against rotation, a driving worm meshing with the gear and mounted to ride thereon when said gear is arrested, said worm being connected to actuate the clutch by such riding movement resulting from an arrest of the gear, and means operable during the positioning of the pre-set means for moving the shaft support.

9. Mechanism of the character described, comprising, an actuating shaft, a drive for the shaft, transmission means connecting the drive to the shaft and embodying a worm and an intermeshing worm gear, said worm being mounted for axial movement on the gear when the latter is arrested, means for arresting the worm gear to effect such axial movement of the worm, and means mounted for operation upon such axial movement of the worm to secure the same against retrograde axial movement independently of the worm gear.

10. Mechanism of the character described, comprising, an actuating shaft, a drive for the shaft, transmission means connecting the drive to the shaft and embodying a worm and an intermeshing worm gear, said worm being mounted for axial movement on the gear when the latter is arrested, a clutch included in the transmission and having a part connected to the worm for declutching the drive when the worm so moves, means for arresting the worm gear to effect such axial movement of the worm, and spring actuated means for holding the worm in its declutched position, said spring actuated means embodying a part positionable by the axially moving worm for initiating the operation of said spring actuated means.

ERWIN C. HORTON.